(12) United States Patent
Harper et al.

(10) Patent No.: US 8,144,684 B2
(45) Date of Patent: *Mar. 27, 2012

(54) SYSTEM AND METHOD FOR TRAFFIC LOCALIZATION

(75) Inventors: Matthew H. Harper, Salem, NH (US); Sanil Kumar Puthiyandyil, Nashua, NH (US); Rajesh Ramankutty, Nashua, NH (US); Shaji E. Radhakrishnan, Nashua, NH (US); Kuntal Chowdhury, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,479

(22) Filed: Feb. 7, 2011

(65) Prior Publication Data

US 2011/0122844 A1      May 26, 2011

Related U.S. Application Data

(63) Continuation of application No. 11/787,740, filed on Apr. 17, 2007, now Pat. No. 7,885,248.

(60) Provisional application No. 60/792,521, filed on Apr. 17, 2006, provisional application No. 60/801,001, filed on May 17, 2006.

(51) Int. Cl.
*H04J 3/24*      (2006.01)
*H04L 12/28*     (2006.01)
*H04W 4/00*      (2009.01)
*H04W 40/00*     (2009.01)

(52) U.S. Cl. ......... 370/349; 370/401; 370/328; 455/428

(58) Field of Classification Search .................. 455/445, 455/433, 436–442, 428; 370/349, 401, 285, 370/331, 328, 338
See application file for complete search history.

(56) References Cited

U.S. PATENT DOCUMENTS 5,717,690 A * 2/1998 Peirce et al. .................. 370/389
6,157,649 A * 12/2000 Peirce et al. .................. 370/401
6,522,880 B1   2/2003 Verma et al.
(Continued)

FOREIGN PATENT DOCUMENTS

EP      1587271      10/2005
(Continued)

OTHER PUBLICATIONS

Chowdhury, K. et al., "Network Based Layer 3 Connectivity and Mobility Management for IPv6," draft-chowdhury-netmip6-01.txt Network Working Group, Internet Draft, Sep. 8, 2006, http://tools.ietf.org/html/draft-chowdhury-netmip6-01.

(Continued)

*Primary Examiner* — Brandon Miller
(74) *Attorney, Agent, or Firm* — Wilmer Cutler Pickering Hale and Dorr LLP

(57) ABSTRACT

Systems and methods for bridging packet flows to bypass call legs and/or tunnels are provided. A tunnel initiator, which can be an access gateway, a foreign agent, and a mobility anchor point, for example, provides a bypass for certain packets that have a destination serviced by the same tunnel initiator. The bridge allows the packets to bypass a backhaul loop and reduces latency and frees bandwidth for other purposes in the network. The bridging can be implemented in a tunnel initiator for mobile to mobile packet flows, mobile to land line packet flows, and land line to mobile packet flows. Route optimization can also be provided in certain embodiments.

20 Claims, 12 Drawing Sheets

U.S. PATENT DOCUMENTS

| | | | |
|---|---|---|---|
| 6,654,792 B1 | 11/2003 | Verma et al. | |
| 6,738,362 B1* | 5/2004 | Xu et al. | 370/329 |
| 6,763,018 B1* | 7/2004 | Puthiyandyil et al. | 370/352 |
| 6,922,411 B1 | 7/2005 | Taylor | |
| 7,426,213 B2* | 9/2008 | Xu et al. | 370/401 |
| 7,885,248 B2* | 2/2011 | Harper et al. | 370/349 |
| 2004/0088385 A1* | 5/2004 | Blanchet et al. | 709/220 |
| 2004/0136337 A1 | 7/2004 | Warrier et al. | |
| 2004/0236855 A1* | 11/2004 | Peles | 709/227 |
| 2005/0078691 A1 | 4/2005 | Davison et al. | |
| 2005/0286504 A1* | 12/2005 | Kwon | 370/356 |
| 2006/0018328 A1 | 1/2006 | Mody et al. | |
| 2006/0067273 A1* | 3/2006 | Suman et al. | 370/331 |
| 2006/0268901 A1* | 11/2006 | Choyi et al. | 370/401 |
| 2007/0097983 A1 | 5/2007 | Nylander et al. | |
| 2007/0105568 A1 | 5/2007 | Nylander et al. | |
| 2008/0176582 A1 | 7/2008 | Ghai et al. | |
| 2008/0298309 A1 | 12/2008 | DePietro et al. | |
| 2008/0310404 A1 | 12/2008 | Valme et al. | |

FOREIGN PATENT DOCUMENTS

| | | |
|---|---|---|
| GB | 2410865 | 8/2005 |
| WO | WO-2004010668 | 1/2004 |

OTHER PUBLICATIONS

Chowdhury, K., "Fast Handoff support for HRPD," 3rd Generation Partnership Project 2, "3GPP2," Apr. 24, 2006.

Chowdhury, K., "Network Based L3 Connectivity and Mobility Management for IPv4," draft-chowdhury-netmip4-00.txt, Feb. 25, 2006, http://tools.ietf.org/hmtl/draft-chowdhury-netmip4-00.

Devarapalli, V. et al., "Proxy Mobile IPv6 and Mobil IPv6 interworking," draft-devarapalli-netlmm-pmipv6-mipv6-00.txt, NETLMM Working Group, Internet Draft, Apr. 10, 2007, http://tools.ietf.org/html/draft-devarapalli-netlmm-pmipv6-mipv6-00.

European Search Report for European Patent Application No. 07755637.1 mailed Mar. 7, 2011. 6 pages.

International Search Report and Written Opinion for International Patent Application No. PCT/US2007/009436 mailed Aug. 25, 2008, 7 pages.

Lior, A. et al., "Mobile IP Key Derivation using EAP," draft-lior-mipkeys-eap-00, Network Working Group, Feb. 25, 2006, http://tools.ietf.org/html/draft-lior-mipkeys-eap-00.

Navali, J. et al., "IPv6 over Network based Mobile IPv4," draft-navali-ip6-over-netmip4-00.txt, Network Working Group, Feb. 25, 2006, http://tols.ietf.org/html/draft-navali-ip6-over-netmip4-00.

* cited by examiner

SYSTEM AND METHOD FOR TRAFFIC LOCALIZATION

CROSS-REFERENCE TO RELATED APPLICATIONS

This application is a Continuation application of co-pending U.S. patent application Ser. No. 11/787,740, filed Apr. 17, 2007, entitled "System and Method for Traffic Localization", which claims benefit under 35 U.S.C. §119(e) of U.S. Provisional Patent Application No. 60/792,521, entitled "A System and Method for Tunnel Switching," filed Apr. 17, 2006, and U.S. Provisional Patent Application No. 60/801,001, entitled "Traffic Localization via Network Based Route Optimization," filed May 17, 2006, which are hereby incorporated by reference herein in their entireties.

FIELD OF THE DISCLOSURE

This invention relates to a system and method for providing packet routing on a network. More particularly, packet flows are bridged in a network to bypass backhaul call legs or tunnels when possible.

BACKGROUND

There have been a few attempts at Route Optimization (RO) solutions developed in the wireless industry. Recently, the notion of route optimization has become synonymous with Mobile IPv6. Mobile IPv6 as defined in RFC 3775, which is hereby incorporated by reference, includes details about using Return Routability (RR) for route optimization. However, there are some significant drawbacks in doing route optimization only as defined in Mobile IPv6 RFC 3775.

First, it is a mobile node centric solution. A mobile node can be a cell phone, a personal digital assistant (PDA), a wirelessly enabled laptop or computer device, or any other applicable device. The initiation of route optimization and the need for optimizing the route with a correspondent node is decided by the mobile node. However, the mobile node has no knowledge of either the routing policies of the network or the network layout. So, the mobile nodes are likely to initiate return routability procedures without knowing whether there will be any difference in the way the IP packets are actually going to be routed.

Second, the network has little or no say on whether route optimization is necessary or whether it is even allowed for certain applications. For example, if the operator has a policy that requires the route to be via a certain network segment or certain nodes (for packet inspection or security and charging policy enforcement), there is no standardized way to allow or disallow the mobile node to initiate route optimization on a per application basis.

Third, the route optimization solution with Mobile IPv6 only works for nodes with either dual stack or IPv6 routing infrastructure in the network. It is costly for operators to completely switchover to an IPv6 network at one time. IPv6 deployment will take time to implement and route optimization should not be tied to only IPv6 capability in the operators' networks.

Fourth, inter-access gateway (AGW) handoff management when mobile initiated route optimization is in use is very time consuming. The mobiles have to perform return routablity (6 messages) every time there is an inter-AGW handoff to inform the other end that a change of care-of address (CoA) has occurred.

Fifth, mobile node based route optimization technique requires over-the-air signaling. For mobile-to-mobile calls, this is about 12 messages per session. For AGW handoffs these have to be repeated. This not only adds over-the-air overhead, but also increases signal processing burden for the mobile and the network nodes.

Finally, even if mobile based route optimization is in use, there is a moment when VoIP packets traverse the reverse tunnel. This occurs because the mobile node reverse tunnels the packets to a home agent before return routablity is complete.

The statistics gathered from circuit voice networks show that the majority of the voice calls made in a region remain within the region (i.e., the calls are highly localized). In some of today's wireless networks, call sessions are routed to a home agent device that tracks where a mobile node is in the network. The calls in Mobile IP based networks often send IP packets to a home agent from the local radio access network in a reverse tunnel. This home agent may not be located geographically close to where the call session originates at the mobile node. If reverse tunneling is not used, it results in triangular routing among the mobile node, a correspondent node (i.e., the second device involved in the call session), and the home agent.

The use of reverse tunneling simplifies the network resource management, policy, and charging enforcement at a centralized location such as the home agent. However, for conversational real time applications, the reverse tunneling causes additional data transport latency which may vary depending on the distance traveled and the number of devices involved (i.e., backhaul link type). The sending of packet data to a home agent also requires the operators to increase backhaul link bandwidth to carry the data traffic for these applications whether or not reverse tunneling is used.

A tunneling protocol, which is used for reverse tunneling and sometimes for sending packets, encapsulates one protocol inside another protocol. Tunneling protocols also provide a mechanism to transport packets between two endpoints over a foreign network.

SUMMARY OF THE DISCLOSURE

Systems and methods for bridging packets are provided in some embodiments. Bridging can be implemented on a network device (e.g., a tunnel initiator) where matching call sessions are co-located. Once a match is determined, a bridge can be established between the call sessions to pass the packets between the call sessions and on to their final destinations. The bridge creates a shortcut for the packet traffic so that the packets are localized. Information regarding the packet flow can be sent to other network devices that provide session management and call control to keep the information regarding the call session current.

Certain embodiments feature a system comprising a tunnel initiator including a first session and a second session as well as a tunnel terminator in communication with the tunnel terminator and including at least one session. The tunnel initiator including a processor that obtains information regarding the first session and the second session, compares session information in the tunnel initiator, and determines if a bridge can be established. The bridge which couples a matching first session and second session for packet data to flow from the matching first session to the matching second session on the tunnel initiator and the tunnel initiator sending updates to the tunnel terminator regarding packet data flowing through the bridge.

Some embodiments feature a method comprising receiving a packet at a tunnel initiator, checking the packet to determine if the packet can be bridged, sending the packet from a first session to a second session on the tunnel initiator, sending the packet to the packet's destination, and updating a tunnel terminator regarding a packet flow from the first session to the second session.

Certain embodiments feature a method comprising creating a first session instance on a tunnel initiator, inspecting packets associated with the first session instance and retrieving information from the packets, associating the information obtained from the packet with the first session, checking if a second session exists on the tunnel initiator that includes information matching the first session, creating a bridge between the first session and the second session after a match is found, and sending a packet from the first session to the second session over the bridge.

DETAILED DESCRIPTION OF THE DISCLOSURE

Systems and methods for bridging selected packet traffic are provided in some embodiments. The bridging can be accomplished by determining a node is a common tunnel initiator (e.g., shared by at least two devices on the same call session) and then bypassing the tunnel terminator(s) of the call session. Bridging at a tunnel initiator reduces the amount of traffic that is backhauled. The bridge can also reduce packet latency and jitter by eliminating the backhaul network hops. The bridge may be implemented at various points and on various devices in a network depending on the network topology. The bridge can be implemented on a foreign agent, an access gateway (AWG), a packet data serving node (PDSN), a foreign agent (FA), a mobility anchor point (MAP), a controlling access point (CAP), a local mobility anchor (LMA), a media gateway (MGW), a media gateway control function (MGCF), a call session control function (CSCF), or a home agent (HA).

Tunnels are deployed in routers and Network Access Servers (NAS). Some examples of common IP-based tunneling protocols are Mobile IP, Layer 2 Tunneling Protocol (L2TP), Point-to-Point Tunneling Protocol (PPTP), IPSEC, IP-in-IP, Generic Routing Encapsulation (GRE)-in-IP, 3GPP2's A10/A11, and IEEE's 802.16e R4/R6. A network entity that initiates the creation of a new tunnel is termed a tunnel initiator and the entity that accepts new tunnels is called a tunnel terminator. It is common for network elements to function in both roles simultaneously (e.g. a router acting as an L2TP Network Server (LNS) and as an L2TP Access Concentrator (LAC)).

Tunneling protocols generally include two functions: call-control and data-encapsulation/transport. The call-control function of a tunneling protocol is used to establish, maintain, and destroy tunnels; this function can be optional if tunnels are pre-configured on the initiator/terminator. The data-encapsulation/transport function provides a mechanism to encapsulate payload data packets, to transport them across the intermediate network to the other end of the previously established tunnel; and to de-encapsulated/deliver the data packets. Tunneling protocol transport/delivery semantics range from basic (unordered best-effort delivery) to advanced (flow-control, encryption, ordered delivery, guaranteed delivery, QoS, etc.)

Figure 1:
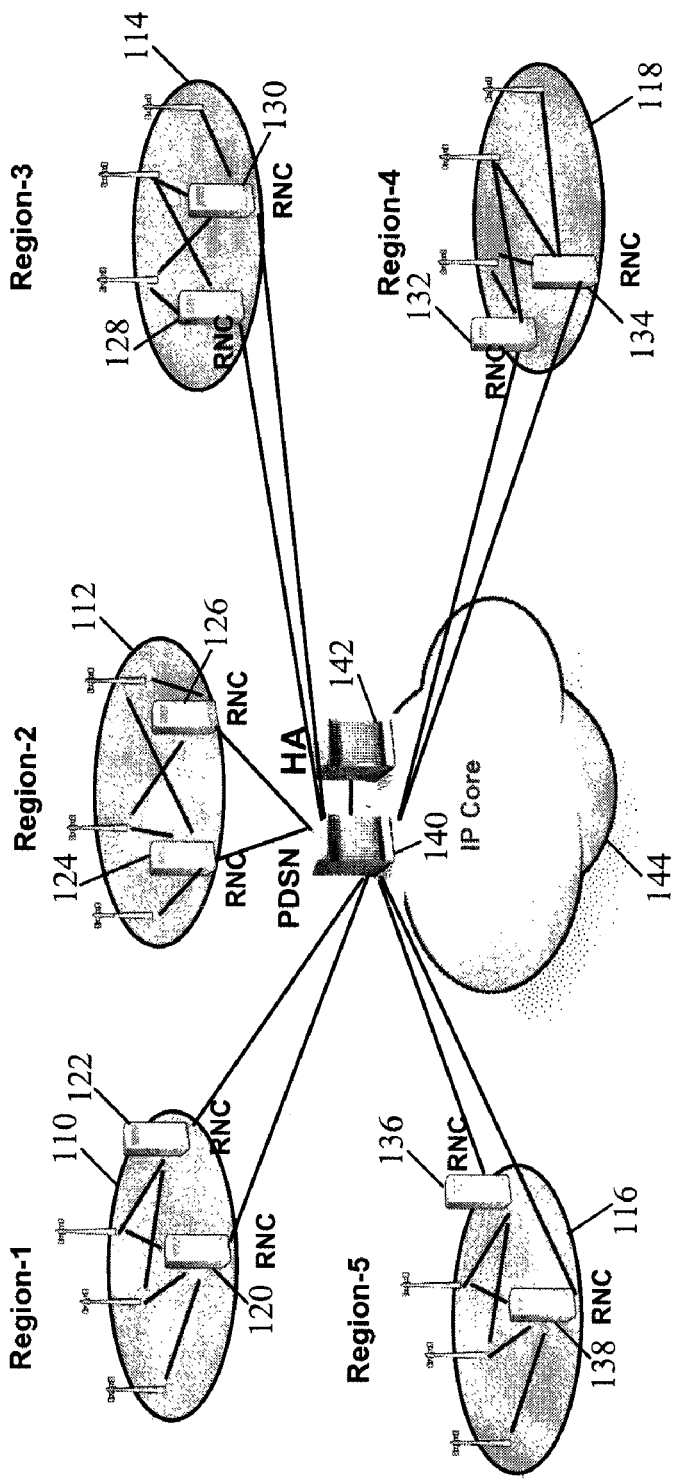
FIG. 1 is a logical diagram of a Mobile IP based network in accordance with some embodiments of the invention.

FIG. 1 is an illustration of a Mobile IP based network in accordance with some embodiments of the invention. In FIG. 1, regions 110-118 are areas of wireless coverage. A Radio Access Network (RAN) covers each region. Depending on the footprint and subscriber density of the regions, there may be one or more Radio Network Controllers (RNC) 120-138 and a number of base stations per region. Packet data can be reverse tunneled into distribution centers where the Packet Data Serving Node (PDSN) 140 and the Home Agent (HA) 142 reside. The distribution centers are located at the edge of IP core 144. Depending on the size of the network, there may be more than one distribution center in the network and the backhaul link between a RNC and PDSN 140 may extend over thousands of miles. The backhaul link can be the distance between a tunnel initiator and a tunnel terminator.

Figure 2:
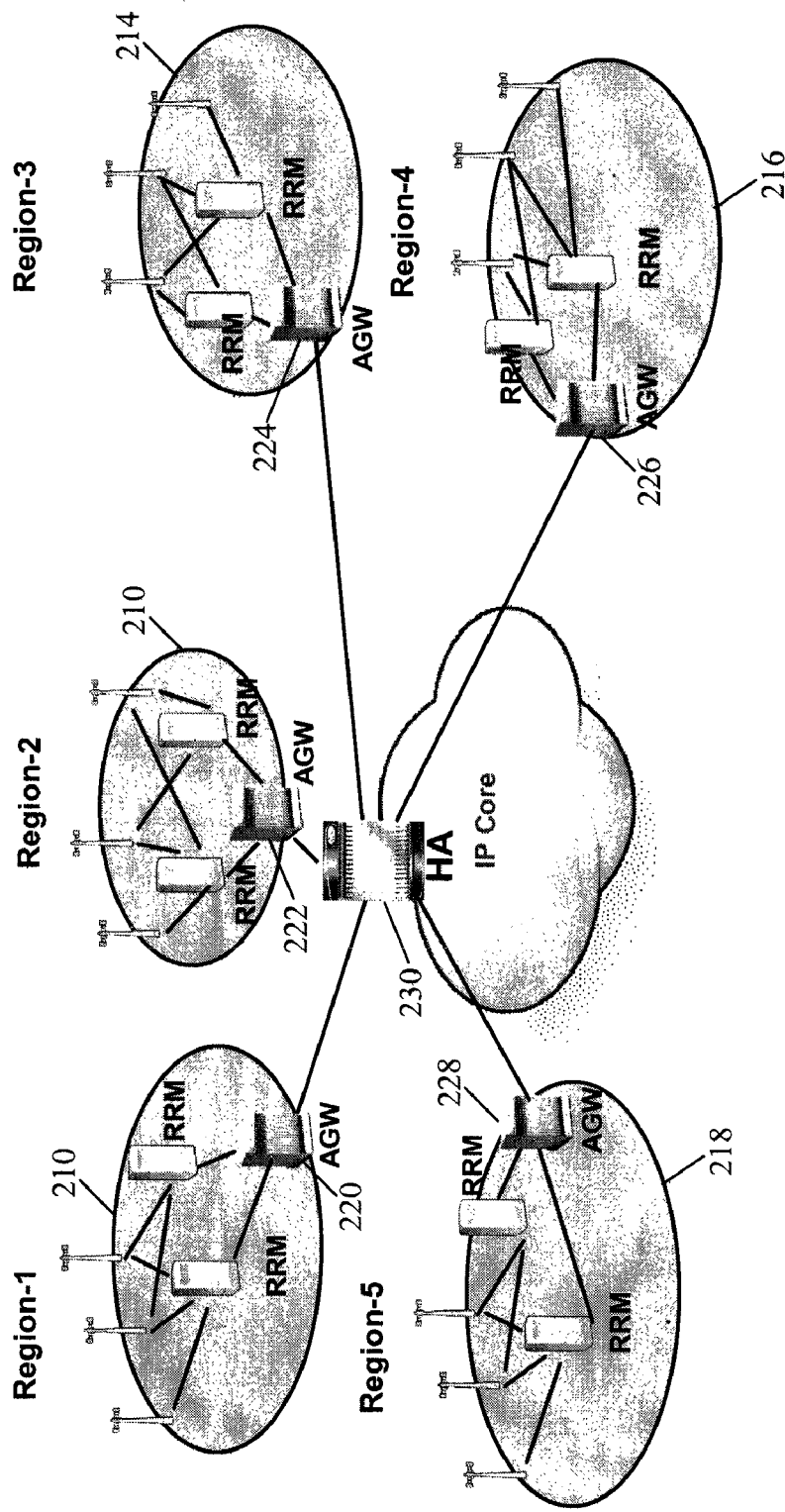
FIG. 2 is a logical diagram of an evolved network layout in accordance with certain embodiments of the invention.

FIG. 2 is an illustration of an evolved network layout in accordance with certain embodiments of the invention. FIG. 2 shows how the current network layout is set to change. In the evolved architecture, the IP edge function is moved closer to regions 210-218. The IP edge function in this illustration is access gateway (AGW) 220-228. The AGW acts as the IP edge device performing NAS (Network Access Server) type functions. In the current network layout (see FIG. 1), PDSN 140 performs these functions. One of the reasons for moving this IP edge function closer to the RAN/Region is to provide a (Local) Mobility Anchor Point (MAP) to reduce signaling latency introduced by Mobile IP protocol for L3 mobility management. As one practiced in the field would appreciate, any applicable localized mobility protocol can be used. Mobile IP or some other tunneling mechanism (e.g., General Tunneling Protocol-User (GTP-U)) can be used between the AGW and home agent 230 (Gateway GPRS Support Node (GGSN) in case of 3GPP). This is called a reverse tunnel and is a backhaul link that can be some distance away from the AGW.

Given that the backhaul link can be some distance away, it is desirable to keep calls localized and avoid backhaul link traffic. In certain embodiments, data traffic is localized through tunnel switching or bridging using a network controlled and network policy driven method. In certain embodiments, an evolved network layout includes one or more VoIP calls that have origination and termination points (e.g., mobile to mobile, mobile to land, and land to mobile) within a region. Normally, traffic is put into the reverse tunnel and transported back into the home agent. However for selected call sessions, such as VoIP calls, the tunnel initiator (e.g., an AGW) can perform functions to bridge the legs of these selected types of call sessions. The tunnel initiator can detect the type of application being run (type of IP flow) and perform this bridging in an automatic fashion. The bridging can be applied for any user-to-user style traffic including gaming, video call sessions, and peer-to-peer file sharing. The policy for this bridging or "route optimization" can be locally configured in the tunnel initiator or it can be downloaded from an external policy function in certain embodiments.

The bridging can also be used in multicast packet traffic situations as well. For example, if a call session involves three people and the people are all using the same tunnel initiator, then bridging can be implemented between the three sessions to remove traffic from backhaul legs. Additionally, for example, if two people of the three are using the same tunnel initiator, then the two call sessions can use bridging while the third call session is handled normally.

A tunnel switch is a device that maps one tunnel into another tunnel; the function is similar to a telephone switchboard operator connecting two legs of a call together. Tunnel switches come in two forms: homogeneous and heterogeneous. Usually, a tunnel switch is the homogeneous case (e.g., an inbound L2TP tunnel is converted into a different L2TP tunnel out). Most Network Access Servers provide a heterogeneous tunnel switching function between inbound access service tunnels and outbound network service tunnels. In some embodiments, a tunnel switch can be used to bridge a call session.

Figure 3:
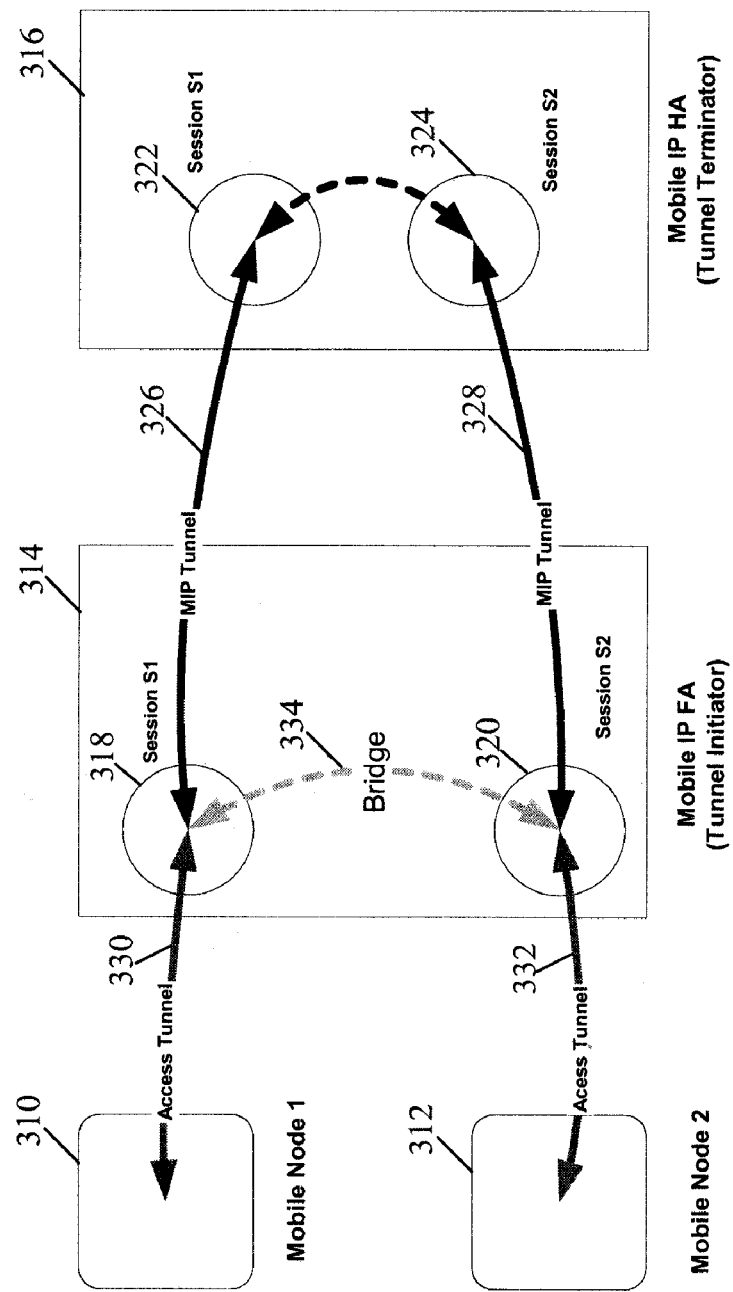
FIG. 3 is a schematic regarding bridging at a tunnel initiator in accordance with certain embodiments of the invention.

FIG. 3 shows how bridging can be implemented in accordance with certain embodiments of the invention. FIG. 3 includes a mobile node 1 310, a mobile node 2 312, a Mobile IP foreign agent tunnel initiator 314, and a Mobile IP home agent tunnel terminator 316. The mobile nodes can be cell phones, PDAs, Blackberries, wireless card enabled laptops, or any other wireless devices. The foreign agent (FA) is a device that routes packet data and stores information about mobile nodes using a foreign network. The home agent (HA) is a device on the home network that stores information about mobile nodes and assists in routing data. Tunnel initiator 314 further includes session S1 318 and session S2 320. Tunnel terminator 316 also includes a session S1 322 and a session S2 324. Sessions 318-324 are implemented in a data structure in software with processing of data packets and tasks associated with the session being completed by a processor on the tunnel initiator. The session is associated with a subscriber's call in some embodiments. A session manager can be used to monitor the session and instruct the processor regarding subscriber data flows related to the session.

A bridge can be created between sessions on a tunnel initiator when the two sessions are found to match and the packet data does not need to be routed any further. As can be seen in FIG. 3, backhaul link traffic may be sent from foreign agent tunnel initiator 314 directly to the destination without having to send the call session traffic back and forth across the backhaul link. In FIG. 3, the backhaul link includes a Mobile IP tunnel 326 to home agent tunnel terminator 316 through foreign agent 314 and a second Mobile IP tunnel 328 to the same home agent 316 using the same foreign agent 314. An access tunnel 330 is also created between Mobile Node 1 310 and foreign agent 314 as well as an access tunnel 332 between Mobile Node 2 312 and the same foreign agent 314. In networks such as FIG. 1, when Mobile Node 1 310 sends a data packet to Mobile Node 2 312 the packet travels to foreign agent 314 and gets tunneled to home agent 316. Home agent 316 receives the packet and identifies the packet as being for Mobile Node 2 312. Home agent 316 tunnels the packet back to foreign agent 314 and foreign agent 314 forwards the packet on to Mobile Node 2 312 through access tunnel 332. Sending packets from session S1 318 to session S2 320 through session S1 322 and session S2 324 adds additional latency and requires more resources such as bandwidth.

Figure 4:
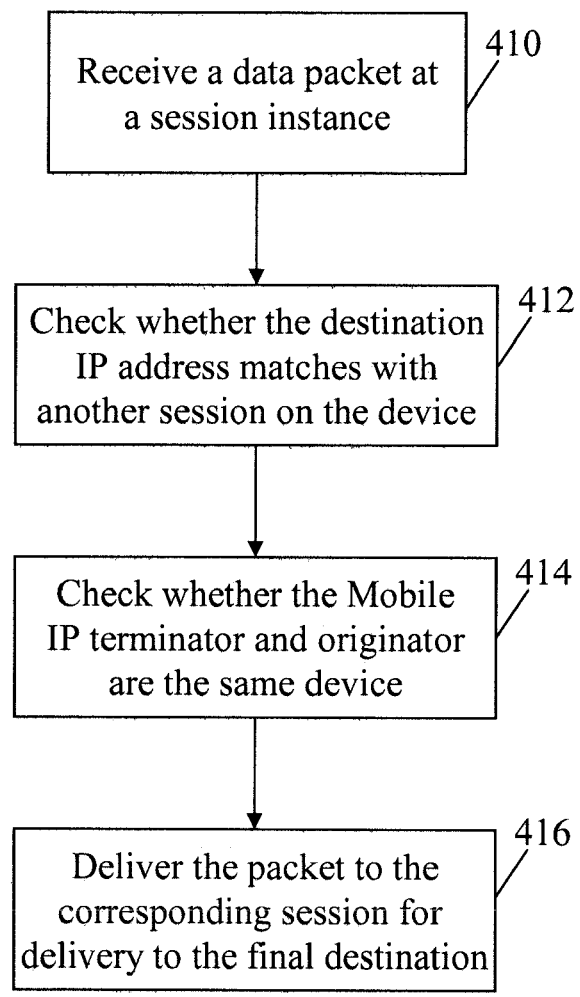
FIG. 4 is a diagram regarding how bridging can be implemented in accordance with certain embodiments of the invention.

In certain embodiments, a bridge 334 is applied at foreign agent 314. Bridge 334 can be implemented by checking whether at least two conditions are met when a packet from Mobile Node 1 310 arrives at foreign agent 314. FIG. 4 illustrates an algorithm for implanting a bridge in accordance with certain embodiments of the invention. In 410, a packet is received at a session on a network device. In 412, software checks whether the destination IP address of the packet matches the IP address of another session on the device. In 414, software checks whether the Mobile IP tunnel initiator and Mobile IP terminator are the same (e.g., session S1 and session S2). If these conditions are met, in certain embodiments, the software directly delivers the packet to the matching session (e.g., from session S1 318 to session S2 320 in FIG. 3) in 416, bypassing the Mobile IP tunneling of that packet to home agent 316. In some embodiments, steps 412 and 414 include a flow-based filter such as a traffic flow template (TFT) that uses a combination of criteria such as: source and destination IP address, protocol used, and source and destination port numbers to determine matching sessions.

In certain embodiments, the bridging is implemented by maintaining a table to check whether certain conditions are met with other sessions on the tunnel initiator. The tunnel initiator can be implemented as software being run on a microprocessor, by hardware such as an Application Specific Integrated Circuit (ASIC), or by any combination of hardware and software. The tunnel switch can be provided on any device where there is an incoming tunnel and an outgoing tunnel for the data. A table with the following information may be implemented for each tunnel on a tunnel initiator:

TABLE 1

Tunnel Initiator Address (V1)
Tunnel Terminator Address (V2)
Subscriber Address (V3)
Outbound Packet Flow Filter (V4)
Inbound Packet Flow Filter (V5)
Data Bypass/Bridge Statistics (V6)

Table 1 includes a Tunnel Initiator Address (V1), a Tunnel Terminator Address (V2), a Subscriber Address (V3), an Outbound Packet Flow Filter (V4), an Inbound Packet Flow Filter (V5), and a Data Bypass/Bridge Statistics (V6). In some embodiments, the table may be implemented on the router with a microprocessor running software, or with hardware logic to implement any logic functions along with a register or cache to store information. The hardware may be implemented in an Application Specific Integrated Circuit (ASIC), a Programmable Logic Device (PLD), or any other suitable hardware technology. The filters (V4) and (V5) can be Layer 3 or Layer 4 packet filters, can be specific to the flow, or can be set pass all packets on to be tested for bridging. The filters can be implemented in instructions that are static or by software that produces instructions regarding packets in the call sessions. The software can be implemented as a rule or policy set that is designed to implement bridging for certain types of call sessions. The data bypass statistics/bridge statistics (V6) can include statistics on byte counts, packet counts, Layer 7 classifications, or any other type of information that may be used by a network device. The data bypass statistics/bridge statistics (V6) may be implemented by any combination of hardware or software on a networking device designed to collect information regarding the data traffic flows and to report the statistics back to another network device such as a home agent or RADIUS server.

A bridge may be implemented through the following steps, in certain embodiments. The tunnel initiator, before sending a packet 'P' to the tunnel terminator, locates packet P's entry (called 'S') in table 1. An outbound packet flow filter (V4) for entry 'S' is applied to packet 'P'. If the filter does not identify the packet as a candidate for bridging, then packet 'P' is tunneled to the tunnel terminator address (V2) provided in table 1 for entry 'S'. If the filter identifies the packet as a candidate for bridging, then the destination address of packet 'P' is extracted and checked in table 1 to determine if there exists an entry 'X' that meets certain conditions. In some embodiments the conditions that are checked are:
1. Entry 'S' Tunnel Initiator Address (V1)==Entry 'X' Tunnel Initiator Address (V1)
2. Entry 'S' Tunnel Terminator Address (V2)==Entry 'X' Tunnel Terminator Address (V2)
3. Destination Address of packet 'P'==Entry 'X' Subscriber Address (V3)
4. Apply inbound packet filter (V5) of entry 'X' to packet 'P'
If the above criteria are true, then the system may update the data bypass/bridge statistics (V6) in entry 'X' and process packet 'P' as being received from entry 'X' Tunnel Terminator Address (V2) with the proper/expected encapsulation. Otherwise if one or more of the criteria are not met, packet 'P' is tunneled to the normal tunnel terminator address (V2) for entry 'S'.

In some embodiments, packet filters (V4) and (V5) may select all packets or just some packets based on layer 3 through layer 7 information. The selectivity provides a mechanism to only bridge traffic that does not require enhanced processing performed at the tunnel terminator (e.g., deep packet inspection/billing). In certain embodiments, the enhanced processing functions are performed on the tunnel initiator so the selectivity is not necessary and bridging can be used for all packets that meet the set criteria. For example, the tunnel initiator may provide enhanced data processing functions on the tunnel bypass data such as access control lists (ACLs), deep packet inspection/billing, content rating/blocking, firewall capabilities.

The tunnel initiator may send periodic statistics updates to the tunnel terminator to inform it about bridged packets. This allows the tunnel terminator to update other call parameters such as idle time. The tunnel initiator may generate accounting records for bridged packet traffic. This may be done using statistics on the packets. The tunnel initiator can send accounting information to tunnel terminator so the tunnel terminator can update accounting parameters for the bridged traffic. This update could be periodic or event driven.

Bridging, in certain embodiments, is used when the tunnel terminator knows that the tunnel initiator is performing this function. An idle timer may need to be disabled or periodically updated on the tunnel terminator so that a session does not time out (e.g., on a home agent) when data is being bridged for an extended period of time. If the tunneling protocol supports handoffs (e.g., Mobile IPv4), the tunnel terminator notifies the tunnel initiator to stop performing bridging when a handoff occurs so that traffic is not mis-delivered by the original tunnel initiator to a stale binding. Bridging can also be disabled when the tunnel initiator is notified by an underlying transport mechanism on the access-side that data is not locally deliverable.

Figure 5:
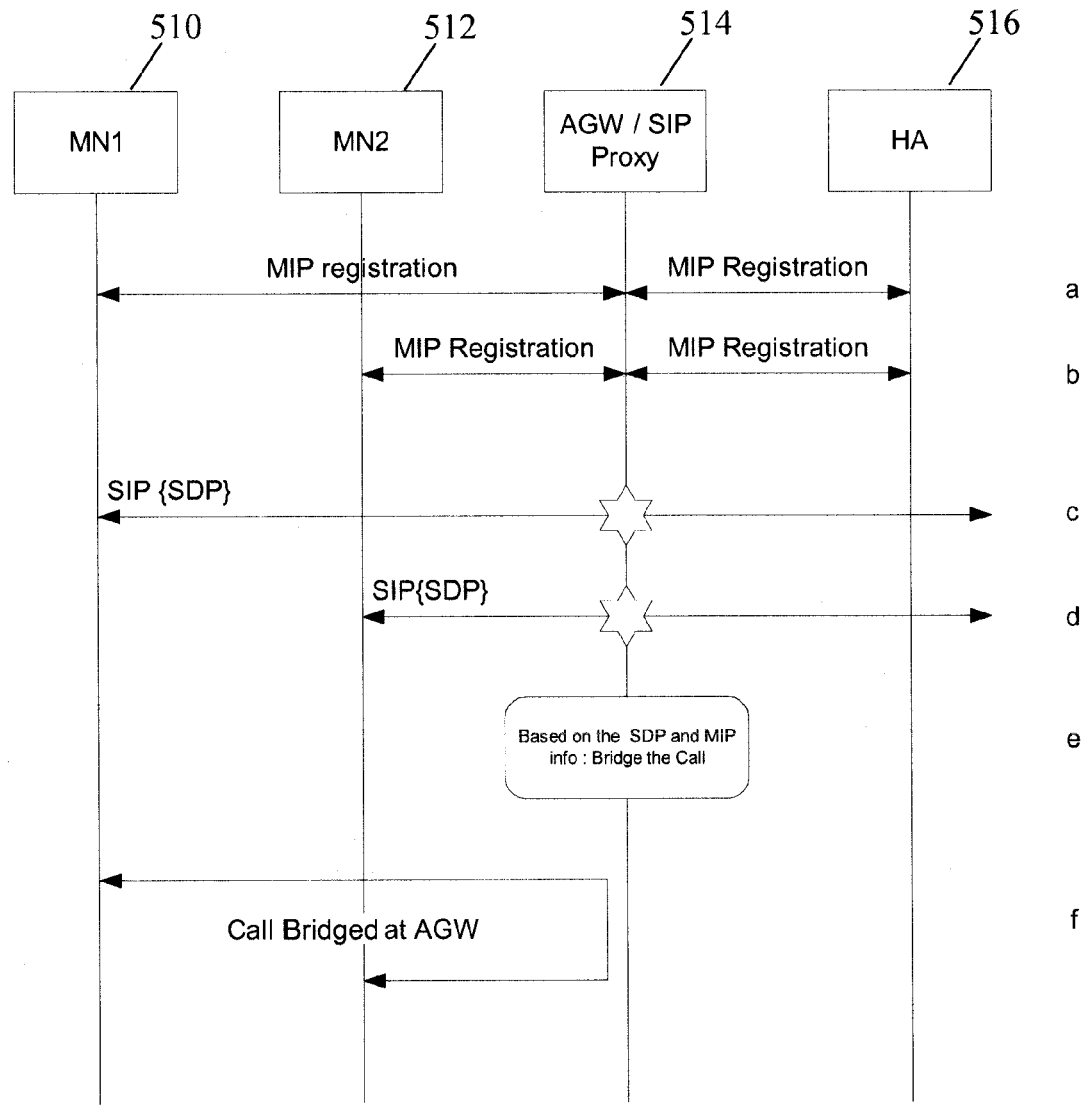
FIG. 5 is a messaging diagram illustrating bridging based on session initiation protocol (SIP) Proxy inspection in accordance with certain embodiments of the invention.

FIG. 5 illustrates messaging involved with bridging based on session initiation protocol (SIP) Proxy inspection in accordance with some embodiments of the invention. FIG. 5 includes a mobile node 1 (MN1) 510, a mobile node 2 (MN2) 512, an access gateway (AGW)/SIP Proxy 514, and a home agent (HA) 516. In "A", mobile node 1 510 performs Mobile IP (e.g., MIPv4) registration. This can be accomplished with either a Foreign Agent-Care of Address (FA-CoA) or a Co-located Care of Address (CCoA). If a FA-CoA is used, AGW 514 can act as the foreign agent and create a mobility binding for mobile node 1 510. As part of this mobility binding creation, the AGW/FA 514 knows the Home Address (HoA) address of mobile node 1 510. In some embodiments, if a mobile node uses CCoA and the mobile node performs MIPv4 registration directly with HA 516, AGW/FA 514 may not explicitly know the HoA that the mobile node acquires. The AGW can discover the HoA via packet inspection.

In "B", mobile node 2 512 performs Mobile IPv4 registration. As described in "A", a FA-CoA or a CCoA can be used for Mobile IP (MIP) registration. If FA-CoA is used, mobile node 2 512 contacts AGW 514, which creates a mobility binding for mobile node 2 512. If a CCoA is used, then MIP registration can be directly with HA 516.

In "C", mobile node 510 initiates a Voice over IP (VoIP) application to call mobile node 2 512 using session initiation protocol (SIP) and a SIP Proxy function residing in AGW 514. In certain embodiments, the SIP Proxy may be located as a stand-alone entity or in another network device. The initial SIP registration messaging is omitted for purposes of brevity, but would be apparent to one practiced in the field. The SIP Proxy inspects the SIP messages (e.g., INVITE) and parses and stores the relevant information from this initial SIP registration messaging. The SIP Proxy stores the various contact designations for mobile node 1 510. The SIP Proxy then proxies the INVITE to MN2.

In "D", AGW/SIP Proxy 514 receives a session progress indication from mobile node 2 512 that includes the various contact designations for mobile node 2 512. In "E", the mobile node contact information is correlated with corresponding Mobile IP session state information and the SIP Proxy state information. AGW 514 can use this information to detect that the VoIP bearer path between mobile node 1 510 and mobile node 2 512 can remain within the local routing domain. AGW 514 can create a bridge by directing Real time Transport Protocol (RTP) streams of mobile nodes using the following algorithms, where the IP address of mobile node 1 510 is X and the IP address of mobile node 2 512 is Y and the respective ports for receiving and transmission are x and y:
If source IP=X & destination IP=Y & protocol=UDP & source port=x & destination port=y; then send packet to Y directly without reverse tunneling
If source IP=Y & destination IP=X & protocol=UDP & source port=y & destination port=x; then send packet to X directly without reverse tunneling
In "F", the data stream is bridged at AGW 514.

Figure 6:
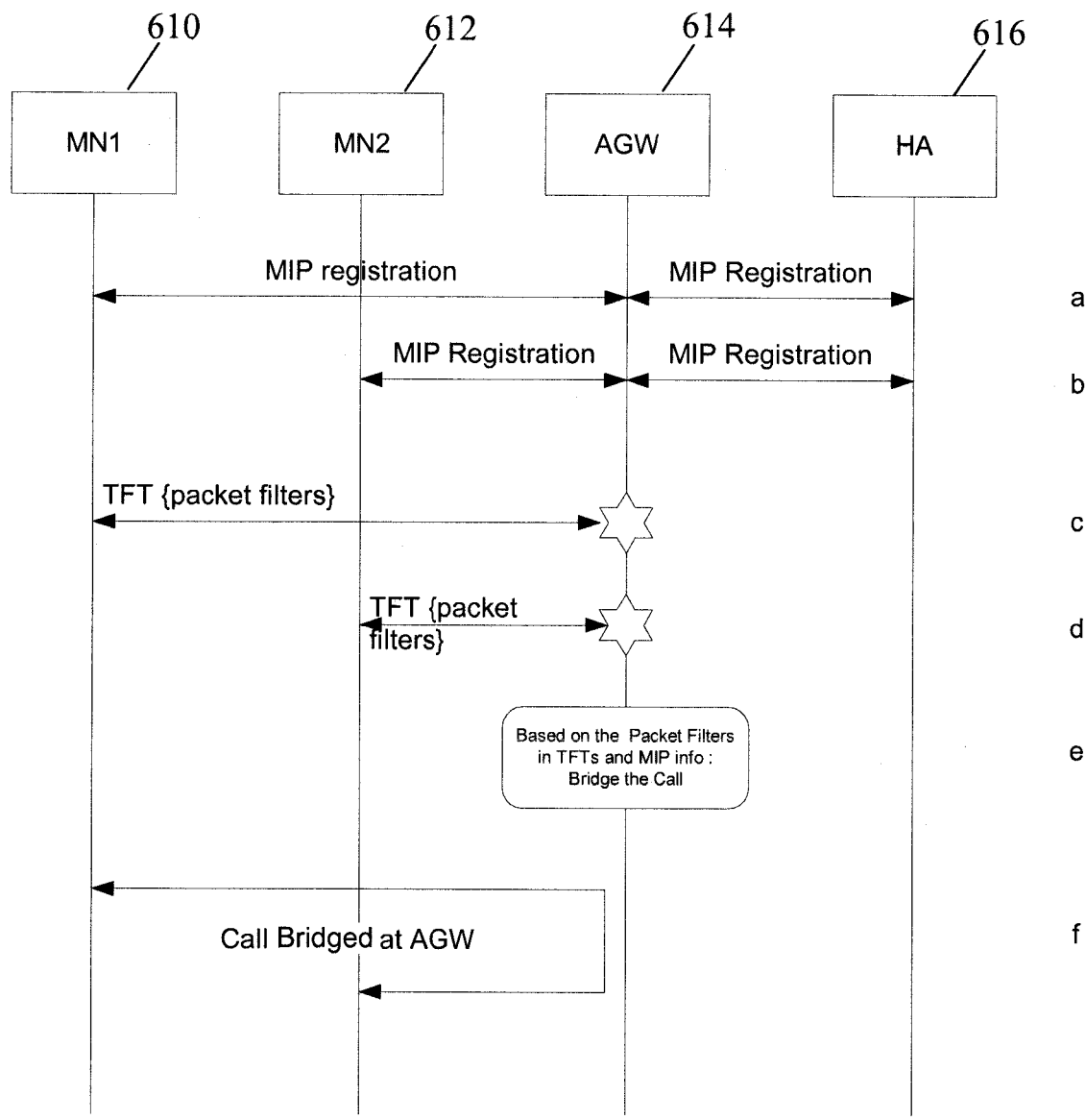
FIG. 6 is a messaging diagram illustrating bridging based on traffic flow template (TFT) processing in accordance with some embodiments of the invention.

FIG. 6 illustrates messaging involved with bridging based on traffic flow template (TFT) processing in accordance with some embodiments of the invention. FIG. 6 includes mobile node 1 (MN1) 610, mobile node 2 (MN2) 612, access gateway (AGW) 614, and home agent (HA) 616. The procedure used in FIG. 6 is similar to the SIP/Session Description Protocol (SDP) inspection procedure of FIG. 5. However, steps "C"-"E" are different because the source of the bridging information used by AGW 614 is different. In "C" and "D" of FIG. 6, mobile node 1 610 and mobile node 2 612 send TFT information to AGW 614. The TFT information includes packet filter information that can include: a source address, a destination address, a source port, a destination port, and a protocol ID. Based on a set of this information from both mobile node 1 610 and mobile node 2 612, and based on the mobility binding information of the respective mobile nodes, AGW 614 can bridge the call legs in "E" to localize the call.

If CCoA is used with MIPv4 in the forward direction, the source address of the outer header is the address of HA 616 and the destination address is the address of the mobile node. The address of the other end (the other mobile node) is in the inner header source address. The destination address of the inner header is the IP address of the mobile node. The set of packet filters in the TFT information may not contain the inner header information. In order to make the process more efficient, the TFT information can include information of the inner source/destination IP address information apart from the same for the outer header. AGW 614 can inspect the inner headers of the received packets to identify the call legs and bridge the call accordingly at "F".

Figure 7:
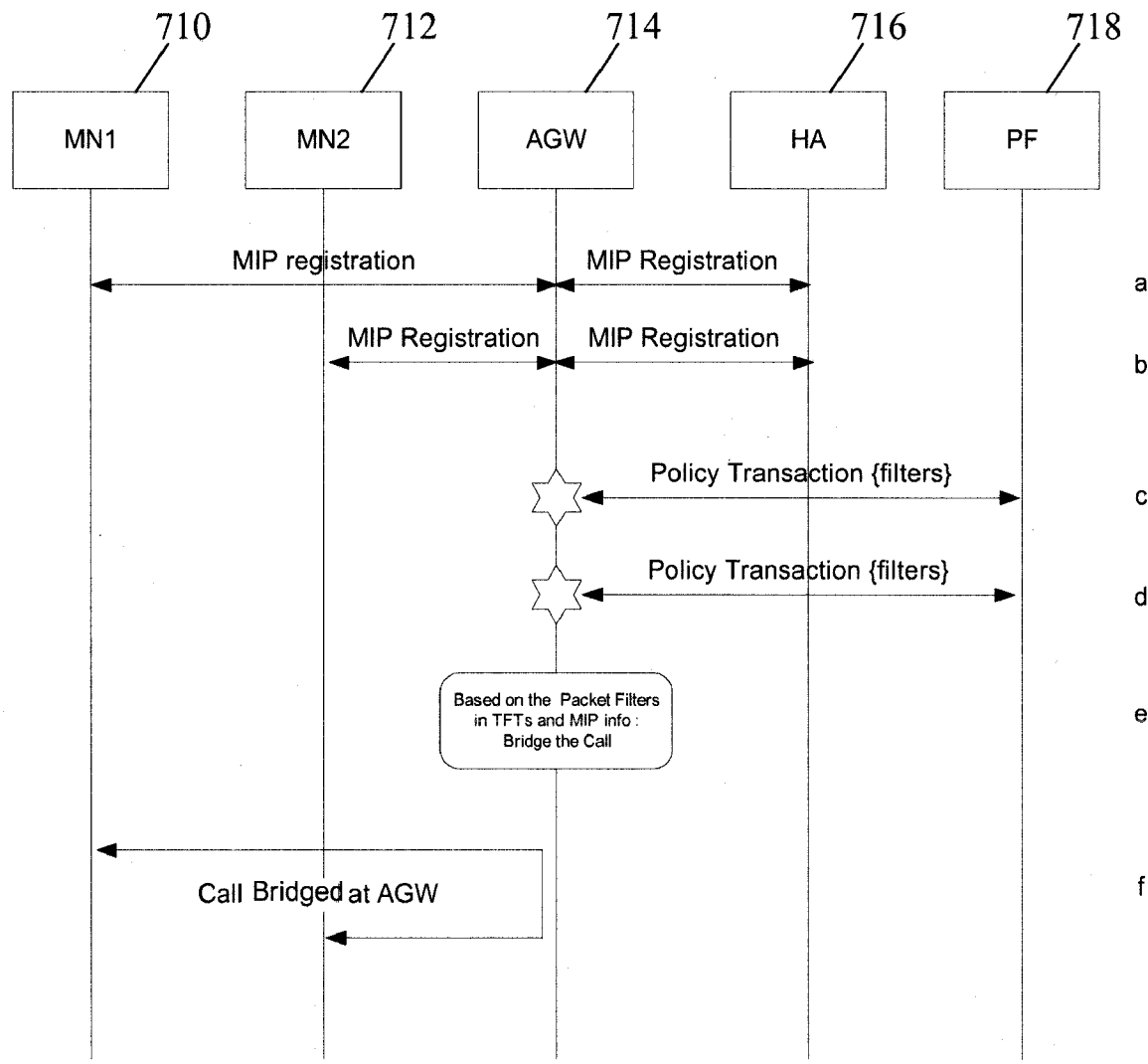
FIG. 7 is a messaging diagram illustrating bridging based on policy transaction information in accordance with some embodiments of the invention.

FIG. 7 illustrates messaging involved with bridging based on policy transaction information in accordance with some embodiments of the invention. FIG. 7 includes a mobile node 1 (MN1) 710, a mobile node 2 (MN2) 712, an access gateway (AGW) 714, a home agent (HA) 716, and a policy function (PF) 718. The procedure used in FIG. 7 is similar to the procedure of FIG. 5 and FIG. 6, but steps "C"-"E" are different because the source of the bridging information used by AGW 714 is different. In "C" and "D", policy function 718 sends quality of service (QoS) and Charging Policy information for the packet flows that mobile node 1 710 and mobile node 2 712 initiate. Policy function 718 can receive call information from a VoIP Application Function (AF) such as a Call Session Control Function (e.g., S-CSCF). Along with the policy information, PF 718 can include packet filters for AGW 714 to identify the packet flows. This information can include: a source address, a destination address, a source port, a destination port, and a protocol ID. Based on the policy and filter information from both the mobile nodes and based on the mobility binding information of the respective mobile nodes, AGW 714 can bridge the call legs in "F" to localize the call.

Policy function 718 or the application function (not shown) can change the bearer route or remove any bridging of the call at the AGW 714 for an ongoing VoIP call by sending updated policy information to AGW 714. Upon receiving such updated policy information, AGW 714 can lift or modify the bridging policy for the call session involved.

If CCoA is used, the packet filters received from the PF may not contain inner header information regarding the VoIP bearer. AGW 714 can inspect the inner headers of the received packets and bridge the call legs accordingly. In order to make the process more efficient, the PF should include information of the inner source/destination IP address information apart from the same for the outer header.

In some embodiments Mobile IPv6 is used for a VoIP call. When both the ends use Mobile IPv6, the MIPv6 session awareness at the AGW can perform packet inspection on Binding Updates (BU) and Binding Acknowledgements (BA). However, in MIPv6, the AGW does not participate in the mobility registration procedure because this takes place between the mobile node and the home agent. Further, depending on the protocol used, the AGW may have some difficulty in inspecting messages to obtain information used to bridge a call.

The BU and the BA messages are visible to the AGW if MIPv6 Authentication Protocol is used (see RFC 4285, which is hereby incorporated by reference). The AGW can use information obtained from inspecting the BU and BA messages to build MIPv6 session awareness. The information obtained from the BU and BA messages can be used to compare and match session information to determine if a bridge can be established. If only MIPv6 base protocol with IPsec (see RFC 3775 and 3776 or IKEv, which are hereby incorporated by reference) is used, the BU and the BA messages may not be visible to the AGW due to IPsec Encapsulation Security Protocol (ESP) encryption. This can hinder the AGW from building the MIPv6 session awareness by inspecting the BU/BA messages. When the AGW cannot inspect the BU and BA messages, the AGW can inspect Type2 Routing Headers that carry IP address information such as home address (HoA) information for bearer traffic. Relying on Type2 Routing Headers and the like may delay the setup of a bridge because bearer traffic begins to flow after BU and BA messaging. Thus, the AGW may not have MIPv6 session awareness to start bridging the call legs immediately. Further modifications may need to be made if IPsec ESP is used for bearer traffic.

The process for implementing a bridge using SIP/SDP inspection, TFT processing, and filter information are similar to the processes described above. After the AGW obtains information relating to the sessions on it, the AGW can determine if call sessions can be bridged.

In some embodiments, bridging is provided for IPv4 and IPv6 without the Layer 3 (L3) Mobility Management of Mobile IP. An example of this is the concept of Mobility Management via network nodes and policy functions in the network. In order to localize the sessions, the operator may choose to deploy a Localized Mobility Solution that is based on a network policy. In these embodiments, there are two different aspects of Mobility:

Local Mobility: This is the intra-domain mobility. The IP session is anchored at a local mobility anchor point (MAP). The IP address the mobile node uses to start a VoIP call is anchored at this local MAP. The footprint a MAP can be reasonably large to cover a geographic area (e.g., a region/metropolitan area) to reduce the possibility of excessive L3 handoffs.

Global Mobility: This type of mobility event is triggered when a mobile node moves out of the area of the MAP with which its IP address is anchored. For example, the mobile node may move from metro area A to metro area B and incur a MAP change. In such a situation, the MAP in the target area B sets up a tunnel Point to Point (P-P) to the MAP in area A where the L3 of the mobile node is anchored. In another scenario, the mobile node moves out of the coverage of the current provider and roams into a different provider's domain. In this type of mobility/roaming, the mobile node normally sets up an IPsec connection back into the provider's network if there is no roaming agreement between the operators.

Figure 8:
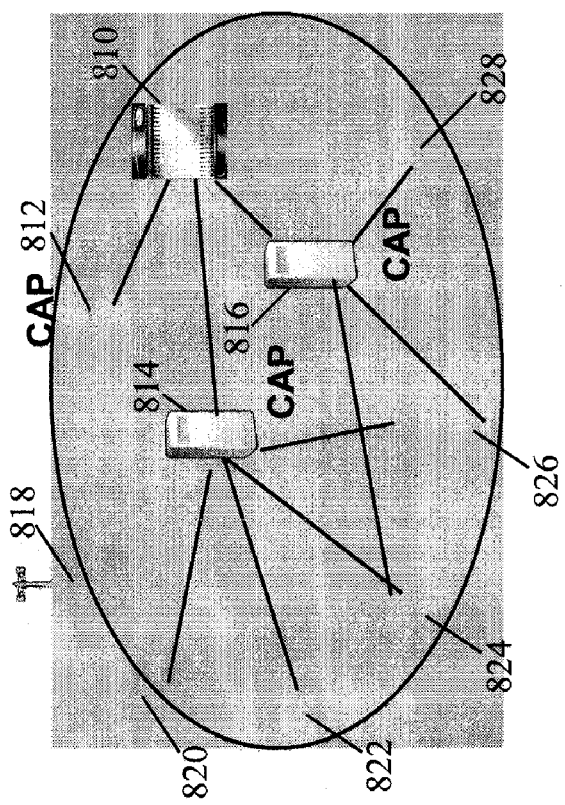
FIG. 8 is a schematic regarding local mobility management with a mobility anchor point in accordance with certain embodiments of the invention.

FIG. 8 illustrates local mobility management with a mobility anchor point in accordance with certain embodiments of the invention. FIG. 8 includes a mobility anchor point (MAP) 810, controlling access points (CAP) 812-816, and access points 818-828. MAP 810 is coupled to CAPs 812-816. CAPs 812-816 are access points that aggregate and terminate radio link protocols (RLP) such as high rate packet data (HRPD). In some embodiments, the CAPs can be access points that are implemented in a PDSN, a FA, a RAN, a PCF, or any other network device. The CAP may also be implemented as an access point that provides Radio Resource Management (RRM) and AGW functionality. MAP 810 is the mobility anchor point and serves as the IP address anchor for one or more mobile nodes. Access points 818-828 are antennas used for transmitting radio frequency waves to and from a mobile node. In some embodiments, mobile nodes obtain IP addresses from a CAP, which can act as the proxy MIP client if proxy MIP is used or can act as an access router. The CAP can act as an access router if, for example, Network-based Localized Mobility Management (NETLMM) is used (see "Proxy Mobile IPv6" available at http://tools.ietf.org/html/draft-ietf-netlmm-proxymip6-00).

Figure 9:
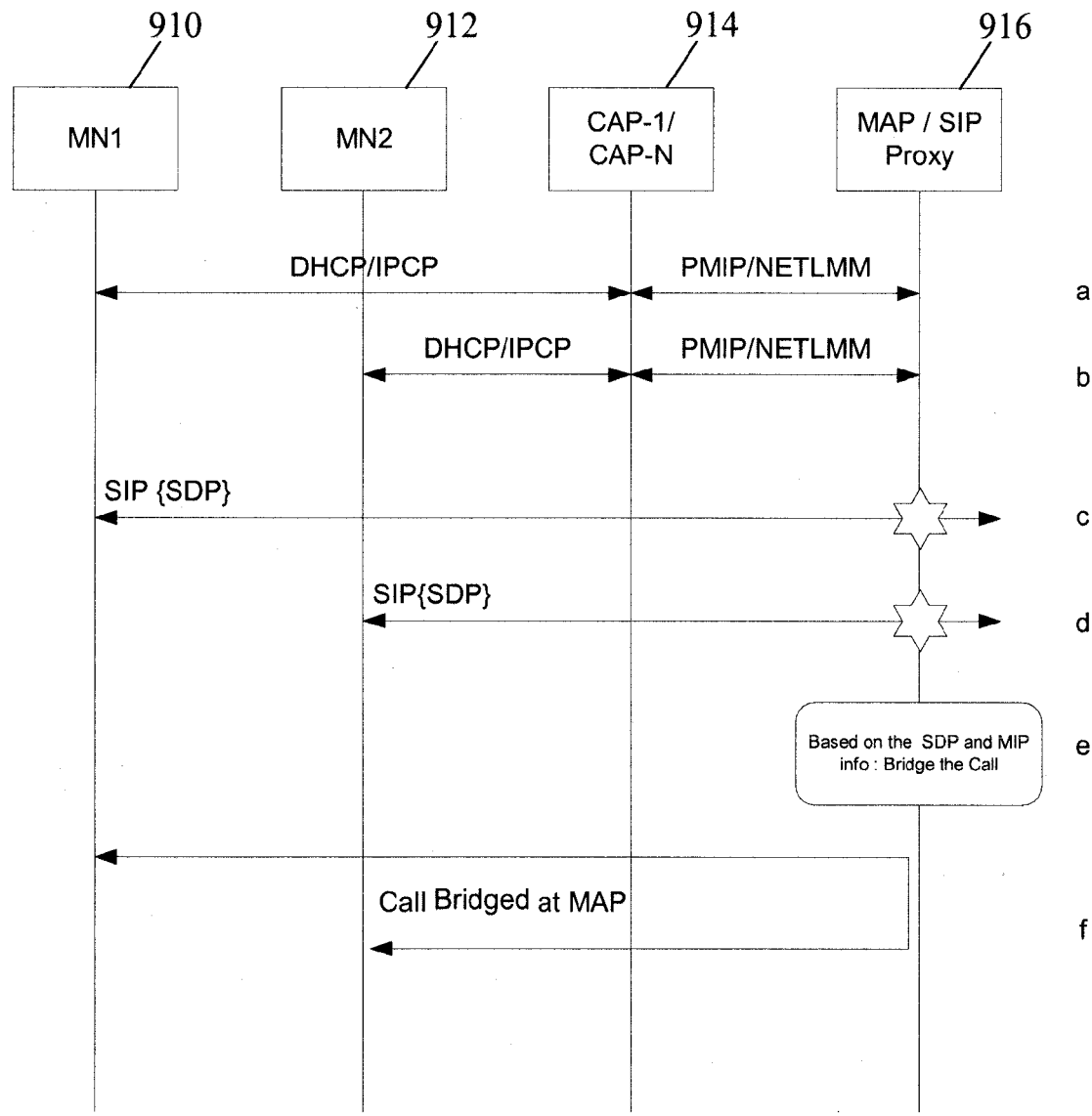
FIG. 9 is a messaging diagram illustrating bridging a call at a MAP in accordance with certain embodiments of the invention.

In some embodiments, a CAP can compile session information and provide bridging functionality. In other embodiments, calls made within the region remain within the same region because the MAP anchors the IP sessions and can bridge the call legs. FIG. 9 illustrates messaging involved with bridging a call at a MAP in accordance with certain embodiments of the invention. FIG. 9 includes a mobile node 1 (MN1) 910, a mobile node 2 (MN2) 912, one or more controlling access points (CAP-1/CAP-N) 914, and a mobility anchor point (MAP)/SIP Proxy 916. In "A", mobile node 1 910 connects to the network through CAP 914. Mobile node 1 910 requests an IP address using internet protocol control protocol (IPCP) or dynamic host configuration protocol (DHCP). CAP1 914 performs a proxy Mobile IP (PMIP) operation (proxy RRQ/RRP or proxy BU/BA) or a NETLMM operation with MAP 916. MAP 916 creates a mobility session with CAP1 914 for mobile node 1 910 and allocates an IP address to mobile node 1 910. CAP1 914 returns the IP address to mobile node 1 910 using IPCP or DHCP.

In "B", mobile node 2 912 connects to the network through CAP 914 and acquires an IP address using a similar procedure to mobile node 1 910 (i.e., Proxy MIP or NETLMM). In "C", mobile node 1 910 initiates a VoIP application to call mobile node 2 912 using SIP and a SIP Proxy function. The SIP Proxy function can be implemented in MAP 916 in some embodiments. The initial SIP registration messaging is omitted for purposes of brevity as one practiced in the field could readily reproduce this messaging. The SIP Proxy can inspect SIP messages (e.g., INVITE) and parse and store the relevant information. For the purposes of implementing bridging the SIP Proxy stores the various contact designations for mobile node 1 910. The SIP Proxy then proxies the INVITE to mobile node 2 912 as shown. In "D", MAP/SIP Proxy 916 receives a session progress indication from mobile node 2 912 which includes the various contact designations for mobile node 2 912.

In "E", the information derived and stored regarding the sessions is correlated with Mobile IP session state information and SIP Proxy state information. This information can be used to detect sessions that can be bridged. MAP 916 can detect that the VoIP bearer path between mobile node 1 910 and mobile node 2 912 can be bridged within the local routing domain. By using the session state information and the contact addresses, MAP 916 creates a bridge by directing the Real time Transport Protocol (RTP) streams of the mobile nodes as follows, where the IP address of mobile node 1 910 is X, the IP address of mobile node 2 912 is Y, and the respective ports for receiving and transmitting are x and y:

If source IP=X & destination IP=Y & protocol=UDP & source port=x & destination port=y; then send packet to Y directly without reverse tunneling If source IP=Y & destination IP=X & protocol=UDP & source port=y & destination port=x; then send packet to X directly without reverse tunneling In "F", the call session is bridged at MAP 916.

In some embodiments, bridging at a MAP can be done using TFT information and policy processing information. These would involve obtaining the same information from the messaging as described above to correlate this information with sessions so bridging can be implemented. The procedures for finding the call legs and bridging them are the same in this case. In some embodiments, when the MAP is configured by policy the MAP does not need to include the SIP proxy or inspect tunneled packet headers to determine if bridging should be implemented. When policy based bridging is implemented on a MAP, the SIP proxy may be located elsewhere in the network.

In some embodiments, the bridging can be implemented using Proxy Mobile IPv4 and Proxy Mobile IPv6 as mobility management protocols. These protocols can implement bridging based in part on the following drafts: "Network Based L3 Connectivity and Mobility Management for IPv4" available at http://tools.ietf.org/id/draft-chowdhury-netmip4-00.txt; "Network Based L3 Connectivity and Mobility Management for IPv6" available at http://tools.ietf.org/id/draft-chowdhury-netmip6-00.txt; and "IPv6 over Network based Mobile IPv4" available at http://tools.ietf.org/id/draft-navali-ip6-over-netmip4-00.txt, which are hereby incorporated by reference herein in their entireties. Using the ideas presented for IPv4 and IPv6 along with the ideas in the drafts, bridging can be extended to Proxy Mobile IPv4 and Proxy Mobile IPv6.

Figure 10:
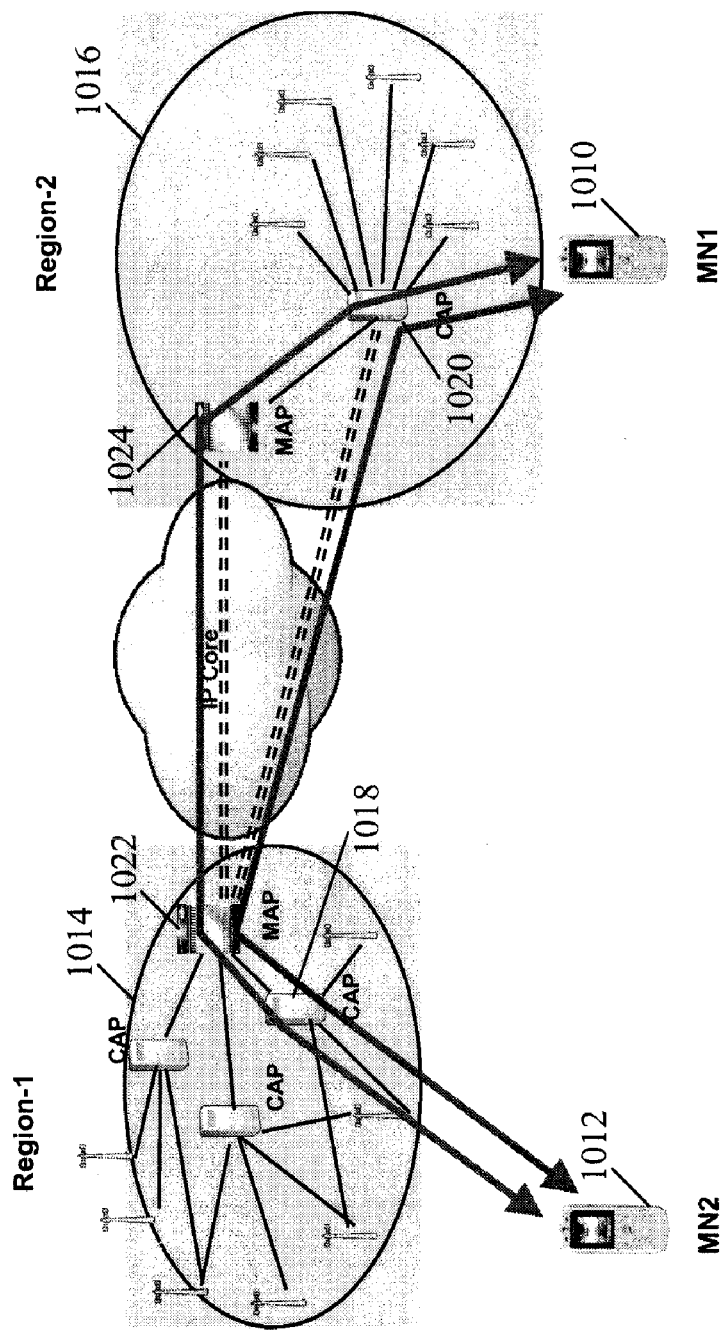
FIG. 10 is a diagram illustrating a handoff situation from a previously bridged call session in accordance with certain embodiments of the invention.

FIG. 10 illustrates a handoff situation from a previously bridged call session in accordance with certain embodiments of the invention. FIG. 10 includes a mobile node 1 (MN1) 1010, a mobile node 2 (MN2) 1012, a region 1 1014, a region 2 1016, a controlling access point (CAP) 1018, a CAP 1020, a mobility anchor point (MAP) 1022, and a MAP 1024. Both mobile node 1 1010 and mobile node 2 1012 began the call session in region 1 1014. Because the call session was within region 1 1014, the call session was bridged at MAP 1022 in region 1 1014. Subsequently, while the call is ongoing, mobile node 1 1010 moves into region 2 1016. CAP 1018 with which mobile node 1 1010 was connected in region 1 1014 communicates with target CAP 1020 in region 2 1016. In this communication with CAP 1020, information such as radio link context information is transferred to provide a radio link handoff.

CAP 1020 in region 2 1016 can connect the call in at least two ways. First, CAP 1020 in region 2 1016 connects back to MAP 1022 in region 1 1014. In some embodiments, this is feasible if CAP 1020 in region 2 1016 has a security association with MAP 1022 in region 1 1014. Second, CAP 1020 selects a MAP 1024 in region 2 1016. MAP 1024 in region 2 1016 and the MAP 1022 in region 1 1014 establish a tunnel to maintain the call. In both the cases, the IP address of mobile node 1 1010 can be anchored at MAP 1022 in region 1 1014.

In some embodiments, the inter-CAP and inter-MAP context transfer tunnel establishment procedures can be implemented in accordance with "Fast Handoff Support for HRPD" available at ftp://ftp.3gpp2.org/TSGX/Working/2006/2006-04/TSG-X-2006-04-KansasCity /WG3-PSN/SWG31-PDS/X31-20060424-011 HRPD-FHO-Starent.doc, which is hereby incorporated by reference herein in its entirety.

Figure 11:
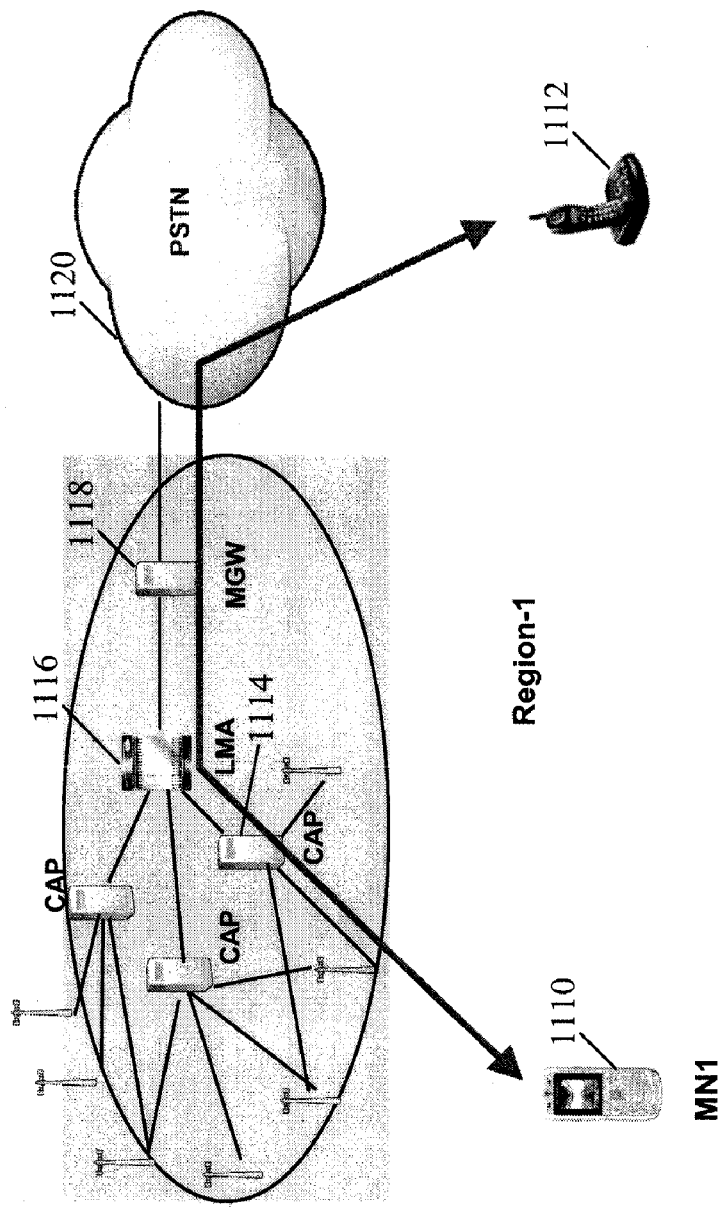
FIG. 11 is a diagram illustrating a mobile to land route with both ends in the same region in accordance with certain embodiments of the invention.

Mobile to land calls can be handled by a media gateway (MGW) in the bearer path. A signaling gateway is also typically used as one practiced in the field would appreciate and discussion of it is omitted for the sake of brevity. When a mobile to land call is made with both the ends being in the same region, call bridging can be used. The public land mobile network (PLMN) and public switched telephone network (PSTN) overlap is determined by the operator's network policy. FIG. 11 illustrates a mobile to land route with both ends in the same region in accordance with certain embodiments of the invention. FIG. 11 includes a mobile node 1110, a phone 1112, a controlling access point (CAP) 1114, a local mobility anchor (LMA) 1116, a media gateway (MGW) 1118, and a PSTN 1120. Media gateway 1118 can be placed in the local PLMN to provide a route that allows for bridging. The LMA can be a network function that acts as the local anchor for a call handled by any of the CAPs in the area of the LMA. The LMA can keep handoff signaling back to a home agent down to a minimum. In certain embodiments, LMA 1116 provides a place to implement the bridging function between calls sessions across multiple CAPs covering a geographical region.

MGW 1118 can be allocated at the local network based on the knowledge of the location of mobile node 1110 and landline phone 1112. The allocation of MGW 1118 can be accomplished by network policy that can be built into a media gateway control function (MGCF) or a call session control function (CSCF). A serving-call session control function (S-CSCF) may be in the local area of mobile node 1110. The MGCF is the entity that selects the MGW to be used for the call and the S-CSCF can use network policy to select an MGCF to handle the call.

Figure 12:
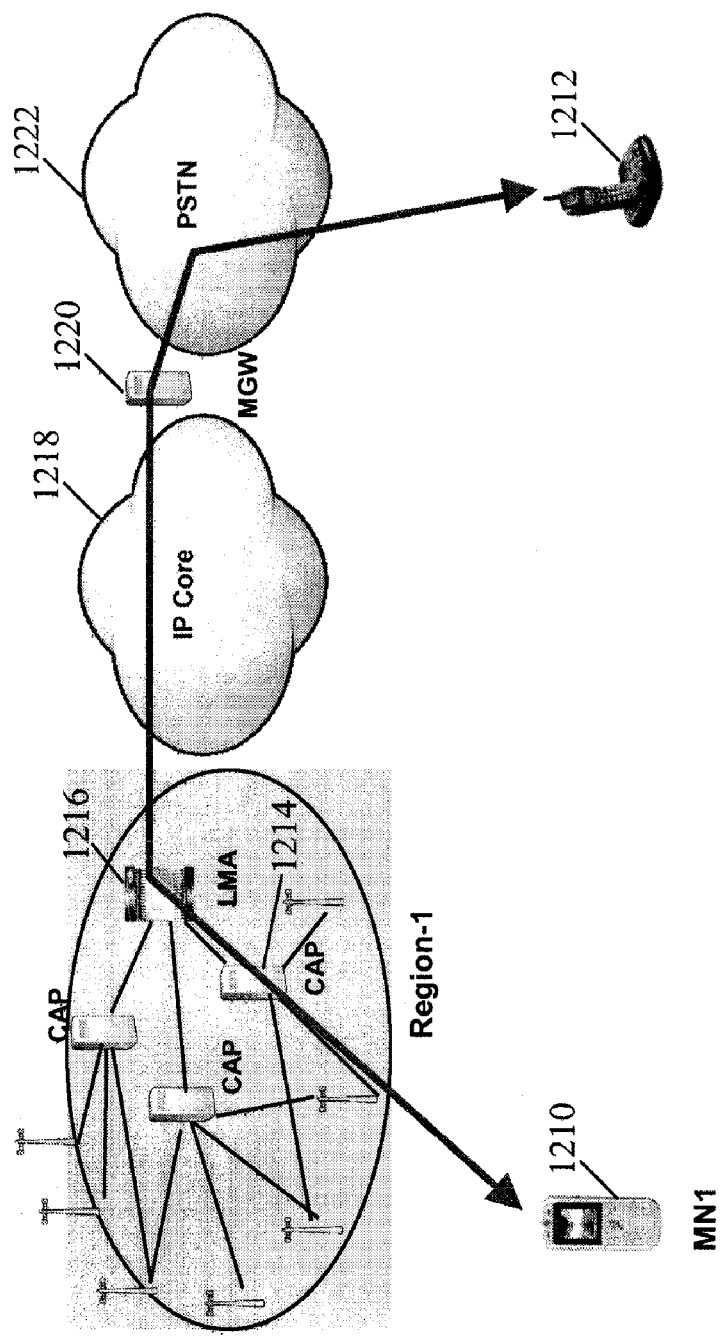
FIG. 12 is a diagram illustrating a mobile to land route with ends in different regions in accordance with certain embodiments of the invention.

FIG. 12 illustrates a mobile to land route with ends in different regions in accordance with certain embodiments of the invention. FIG. 12 includes a mobile node 1210, a phone 1212, controlling access point (CAP) 1214, a local mobility anchor (LMA) 1216, an IP core 1218, a media gateway 1220, and a public switched telephone network 1222. Mobile node 1210 contacts CAP 1214 to initiate a VoIP call to phone 1212, which is in a different region. In some embodiments, network policy rules in a MGCF and/or CSCF can route the call session packets from MN1 over IP core 1218 as much as possible to try and optimize backbone bandwidth utilization. The land to mobile call scenario is similar to the mobile to land call scenario.

Normally packets to/from mobile node 1210 is backhauled from LMA 1216 to a home agent (not shown), which sends the packets to MGW 1220, and MGW 1220 sends the call session across the PSTN 1222 to get to phone 1212. If the home agent is not local to MGW 1220 servicing phone 1212, there is more backhaul traffic. By implementing bridging functionality in LMA 1216 located with a MGW in a geographical region, backhaul of bearer traffic (even when crossing between packet and PSTN 1222) can be eliminated.

Accounting at the bearer layer for the bridged sessions can be performed at a node that is guaranteed to be on data path. In some embodiments, the nodes that are guaranteed to be on the data path are the AGW and/or the MAP or LMA. If a network based mobility management scheme is deployed, the MAP is a location where data path is visible for both online and offline (prepaid) accounting. The MAP can be used to generate usage detail records (UDR), event detail records (EDR), and flow detail records (FDRs) as part of the flow based charging function. In a network where MAPs do not exist but AGWs are used for VoIP call localization, the online and offline charging and accounting can be part of the AGW.

In some embodiments, security policy enforcement may be moved to monitor bridged call sessions. The AGW and the MAP can be the locations where basic security policy enforcements are performed. If MN to Network (UNI), IPsec, or TLS is deployed, the AGW and the MAP can serve as the IPsec/Transport Layer Security (TLS) gateway. The IPsec/TLS gateway in the AGW or MAP also allows for security association sharing across multiple sessions and a single IPsec tunnel can be used to protect mobility signals and SIP signals.

If network based mobility management is adopted by the operators, the security mechanism based on dynamic key distribution can be used. The message authentication keys for proxy Mobile IP operation can be either provisioned per CAP-MAP pair, or these can be dynamically bootstrapped and distributed via mechanism such as EAP (Extensible Authentication Protocol) or EMSK (Extended Master Session Key) based keying (see "Mobile IP Key Derivation using EAP" available at http://tools.ietf.org/id/draft-lior-mipkeys-eap-00.txt).

In some embodiments, an access gateway (AWG), a packet data serving node (PDSN), a foreign agent (FA), a mobility anchor point (MAP), a controlling access point (CAP), a local mobility anchor (LMA), a media gateway (MGW), a media gateway control function (MGCF), a call session control function (CSCF), or a home agent (HA) can be implemented on a Starent Networks, Corp. of Tewksbury, Mass. ST16 or ST40 Intelligent Mobile Gateway (IMG) chassis ("chassis"). Other types of devices can also be used in other embodiments are a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF).

In some embodiments, software needed for implementing a process includes a high level procedural or an object-orientated language such as C, C++, C#, Java, or Perl. The software may also be implemented in assembly language if desired. Packet processing implemented in a chassis may include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

In certain embodiments, one or more of the above-mentioned other types of devices are integrated together or provided by the same device. For example, an access network can be integrated with a PDSN. A chassis can include a PDSN, a FA, a HA, a GGSN, a PDIF, an ASNGW, a UPE, an IP Gateway, an access gateway, or any other applicable access interface device.

The chassis can implement many types of logical or functional devices such as a PDSN, GGSN, PDIF, ASNGW, FA, and HA as well as providing tunnel bypass or bridging services. The chassis includes slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, or PDIF).

The chassis software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:
1. A network device comprising:
an interface configured to communicate with a first mobile node and a second mobile node;
a storage medium configured to store session information about the first mobile node and the second mobile node that is used to manage processing of packet data associated respectively with the first mobile node and the second mobile node; and a processor configured to determine when the first mobile node and the second mobile node are communicating with one another and such communications are passing through the network device, wherein the processor is configured to establish a data bypass so data is sent and received directly between the first mobile node and the second mobile node at the network device and updates are communicated to a mobility anchor point.

2. The network device of claim 1, wherein the network device is an access gateway and the mobility anchor point is a home agent that tracks where a mobile node is in the network.

3. The network device of claim 1, wherein the interface receives a Voice over IP (VoIP) application request from the first mobile node for communication with the second mobile node.

4. The network device of claim 1, wherein the network device provides a second network device with session information of the first mobile node in a handoff of the first mobile node and disables the data bypass between the first mobile node and the second mobile node.

5. The network device of claim 1, wherein the processor inspects source and destination IP address, protocol used, and source and destination port numbers using a packet filter to determine when the data bypass is established.

6. The network device of claim 1, wherein the updates to the mobility anchor point include accounting information regarding the data exchange between the first and second mobile nodes.

7. The network device of claim 1, wherein a first session and a second session are implemented in the storage medium and the first session and the second session are each used to manage processing of packet data associated respectively with the first mobile node and the second mobile node.

8. A method comprising:
establishing communications at a network device with a first mobile node, a second mobile node, and a mobility anchor point;
managing separately, at the network device, processing of packet data corresponding to the first mobile node and the second mobile node based on session information for the first mobile and the second mobile node respectively;
checking session information, at the network device, regarding the packet data communications between the first mobile node and the second mobile node to determine if a data bypass can be established;
establishing a data bypass to send and receive data directly between the first mobile node and the second mobile node at the network device.

9. The method of claim 8, further comprising updating the destination device regarding the data bypass until the data bypass is disabled.

10. The method of claim 8, wherein the network device is an access gateway and the mobility anchor point is a home agent that tracks where a mobile node is in the network.

11. The method of claim 8, further comprising receiving a Voice over IP (VoIP) application request from the first mobile node for communication with the second mobile node.

12. The method of claim 8, further comprising inspecting source and destination IP address, protocol used, and source and destination port numbers using a packet filter to determine when the data bypass is established.

13. The method of claim 8, further comprising implementing a first session and a second session where the first session and the second session are each used to manage processing of packet data associated respectively with the first mobile node and the second mobile node.

14. Logic encoded in one or more non-transient media for execution and when executed by a processor is operable to perform operations comprising:
establishing communications at a network device with a first mobile node, a second mobile node, and a mobility anchor point;
managing separately, at the network device, processing of packet data corresponding to the first mobile node and the second mobile node based on session information for the first mobile and the second mobile node respectively;
checking session information, at the network device, regarding the packet data communications between the first mobile node and the second mobile node to determine if a data bypass can be established;
establishing a data bypass to send and receive data directly between the first mobile node and the second mobile node at the network device.

15. The logic of claim 14, further comprising updating the destination device regarding the data bypass until the data bypass is disabled.

16. The logic of claim 14, wherein the network device is an access gateway and the destination is a home agent that tracks where a mobile node is in the network.

17. The logic of claim 14, further comprising receiving a Voice over IP (VoIP) application request from the first mobile node for communication with the second mobile node.

18. The logic of claim 14, further comprising inspecting source and destination IP address, protocol used, and source and destination port numbers using a packet filter to determine when the data bypass is established.

19. The logic of claim 14, further comprising implementing a first session and a second session where the first session and the second session are each used to manage processing of packet data associated respectively with the first mobile node and the second mobile node.

20. The logic of claim 14, wherein establishing communications includes setting up a layer 2 tunneling protocol (L2TP).

* * * * *